(12) United States Patent
Flanigan et al.

(10) Patent No.: US 8,697,762 B2
(45) Date of Patent: Apr. 15, 2014

(54) SILICA FILLER PRETREATED WITH BIO-BASED POLYOL AND ELASTOMER COMPOSITION CONTAINING THE SAME

(71) Applicant: Ford Global Technologies, LLC, Dearborn, MI (US)

(72) Inventors: Cynthia Mowery Flanigan, Canton, MI (US); Laura Dillon Beyer, Canton, MI (US); David William Klekamp, Canton, MI (US); David Scott Rohweder, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/910,379

(22) Filed: Jun. 5, 2013

(65) Prior Publication Data

US 2013/0289162 A1 Oct. 31, 2013

Related U.S. Application Data

(62) Division of application No. 13/459,285, filed on Apr. 30, 2012, now Pat. No. 8,487,014.

(51) Int. Cl.
*C08G 18/00* (2006.01)
*C08J 9/32* (2006.01)

(52) U.S. Cl.
USPC ....... 521/84.1; 521/109.1; 521/137; 521/151; 521/155

(58) Field of Classification Search
USPC ............... 521/84.1, 109.1, 137, 151, 155
See application file for complete search history.

(56) References Cited

U.S. PATENT DOCUMENTS

| 7,150,301 | B2 | 12/2006 | Serra et al. |
| 7,211,611 | B2 | 5/2007 | Wilson, II |
| 7,285,584 | B2 | 10/2007 | Hsu et al. |
| 7,473,724 | B2 * | 1/2009 | Hsu et al. ............ 524/114 |

* cited by examiner

*Primary Examiner* — Robert D. Harlan
(74) *Attorney, Agent, or Firm* — Damian Porcari

(57) ABSTRACT

A method includes mixing a filler including silica and a bio-based oil including a soy polyol to form a filler mixture, and mixing the filler mixture with an elastomer to form an elastomeric composition. The weight ratio of silica to the soy polyol is 1.5 to 2.5. The elastomer is present in an amount less than 25 weight percent of the elastomeric composition.

20 Claims, 2 Drawing Sheets

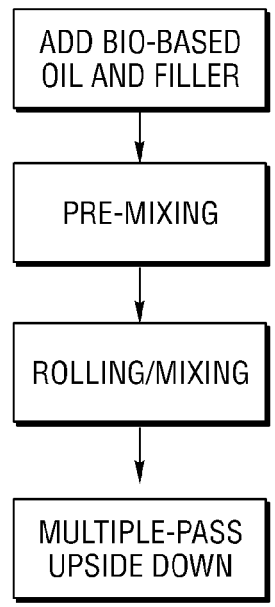
Fig. 1A
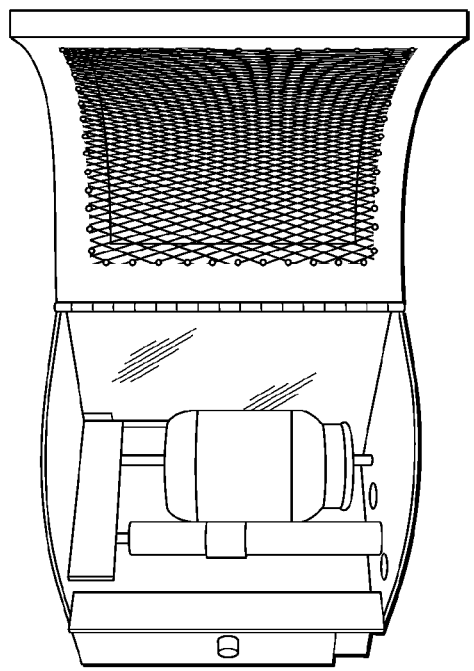
Fig. 1B1
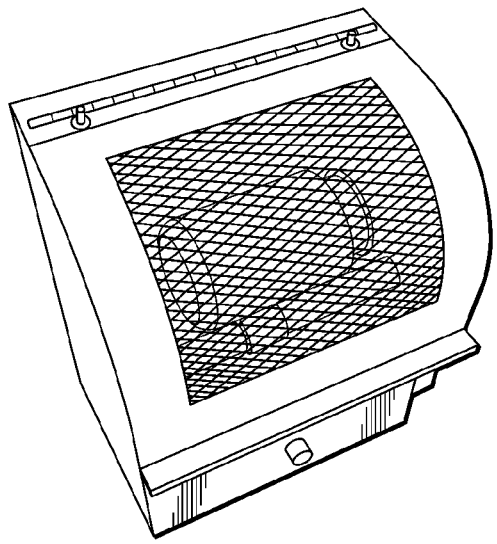
Fig. 1B2

SILICA FILLER PRETREATED WITH BIO-BASED POLYOL AND ELASTOMER COMPOSITION CONTAINING THE SAME

CROSS-REFERENCE TO RELATED APPLICATION

This application is a division of U.S. application Ser. No. 13/459,285 filed Apr. 30, 2012, and issued Jul. 16, 2013 as U.S. Pat. No. 8,487,014, the disclosure of which is incorporated in its entirety by reference herein.

TECHNICAL FIELD

The present invention relates to silica filler pretreated with bio-based polyol and elastomer composition containing the same, and related methods.

BACKGROUND

Typical elastomer formulations for automotive applications such as gaskets, floor mats, splash shields and radiator shields use petroleum-derived materials. For example, EPDM (ethylene propylene diene monomer), formulations often incorporate portions of petroleum oil, synthetic elastomer and carbon black. Additional applications may include shoes, conveyor belts and tires.

Conventional elastomer formulations using petroleum oil have been met with limited use. Being derived from petroleum, petroleum oil is a non-renewable resource. Many uncertainties associated with the use of petroleum-derived materials reside in the long-term economic instability and limited reserves of fossil fuels and oils. The production of the petroleum-derived materials requires a great deal of energy, as the raw petroleum oils are drilled, extracted from the ground, transported to refineries, refined, and processed to yield the petroleum oils. These efforts add to the cost of petroleum oils and hence the cost of the final elastomer products.

There is a continuing need for "greener" elastomer products made from raw materials that are more versatile, renewable, less costly and more environmental friendly.

SUMMARY

In one embodiment, a method is disclosed. The method includes mixing a filler including silica and a bio-based oil including a soy polyol to form a filler mixture, and mixing the filler mixture with an elastomer to form an elastomeric composition. The weight ratio of silica to the soy polyol is 1.5 to 2.5. The elastomer is present in an amount less than 25 weight percent of the elastomeric composition. The first mixing step may include mixing the filler including silica, the bio-based oil including the soy polyol, and a petroleum-based oil present in an amount of less than 25 weight percent of the elastomeric composition. The bio-based oil may further include a soy oil. The first mixing step may include mixing the filler including silica, the bio-based oil including the soy polyol, and an epoxidized oil present in an amount of less than 25 weight percent of the elastomeric composition. The soy polyol may have a hydroxyl number of from 10 to 350 KOH/g. The first mixing step may include mixing the filler including silica, the bio-based oil including the soy polyol, and carbon black.

In certain embodiments, the first mixing step may include mixing the filler including silica, the bio-based oil including the soy polyol, and an ancillary filler. The ancillary filler may be selected from the group consisting of soy protein, soy flour, soy meal, soy hull and combinations thereof. In certain variations, the weight ratio of silica to soy polyol is in the range of 1.7 to 2.3. In other variations, the weight ratio of silica to soy polyol is in the range of 1.9 to 2.1. The first mixing step may include mixing and rolling the filler including silica and the bio-based oil including a soy polyol to form the filler mixture. The first mixing step may be performed in a mixer. The first mixing step may be carried out at a starting temperature and proceed to an ending temperature greater than the starting temperature.

In another embodiment, a method is disclosed. The method may include mixing a filler including silica and a bio-based oil including a soy polyol to form a filler mixture, mixing the filler mixture with an elastomer to form an elastomeric composition, and curing the elastomeric composition to obtain a cured elastomeric composition. The weight ratio of silica to the soy polyol may be 1.5 to 2.5. The elastomer may be present in an amount less than 25 weight percent of the elastomeric composition. In this embodiment, the weight ratio of silica to soy polyol is in the range of 1.7 to 2.3, or from 1.9 to 2.1.

In yet another embodiment, the method may include mixing a filler including a precipitated silica material and a bio-based oil including a soy polyol to form a filler mixture, and mixing the filler mixture with an elastomer to form an elastomeric composition. The weight ratio of precipitated silica material to the soy polyol may be in the range of 1.7 to 2.3 or 1.9 to 2.1. In one variation, the filler further includes carbon black.

BRIEF DESCRIPTION OF THE DRAWINGS

FIG. 1A depicts a non-limiting sample process of premixing filler with bio-based oil according to one or more embodiments;

FIGS. 1B1 and 1B2 depicts a way of rolling mixing the premix in relation to FIG. 1A; and FIG. 2 depicts elongation values of a list of prepared compositions according to the example(s) described herein.

DETAILED DESCRIPTION

Figure 2:
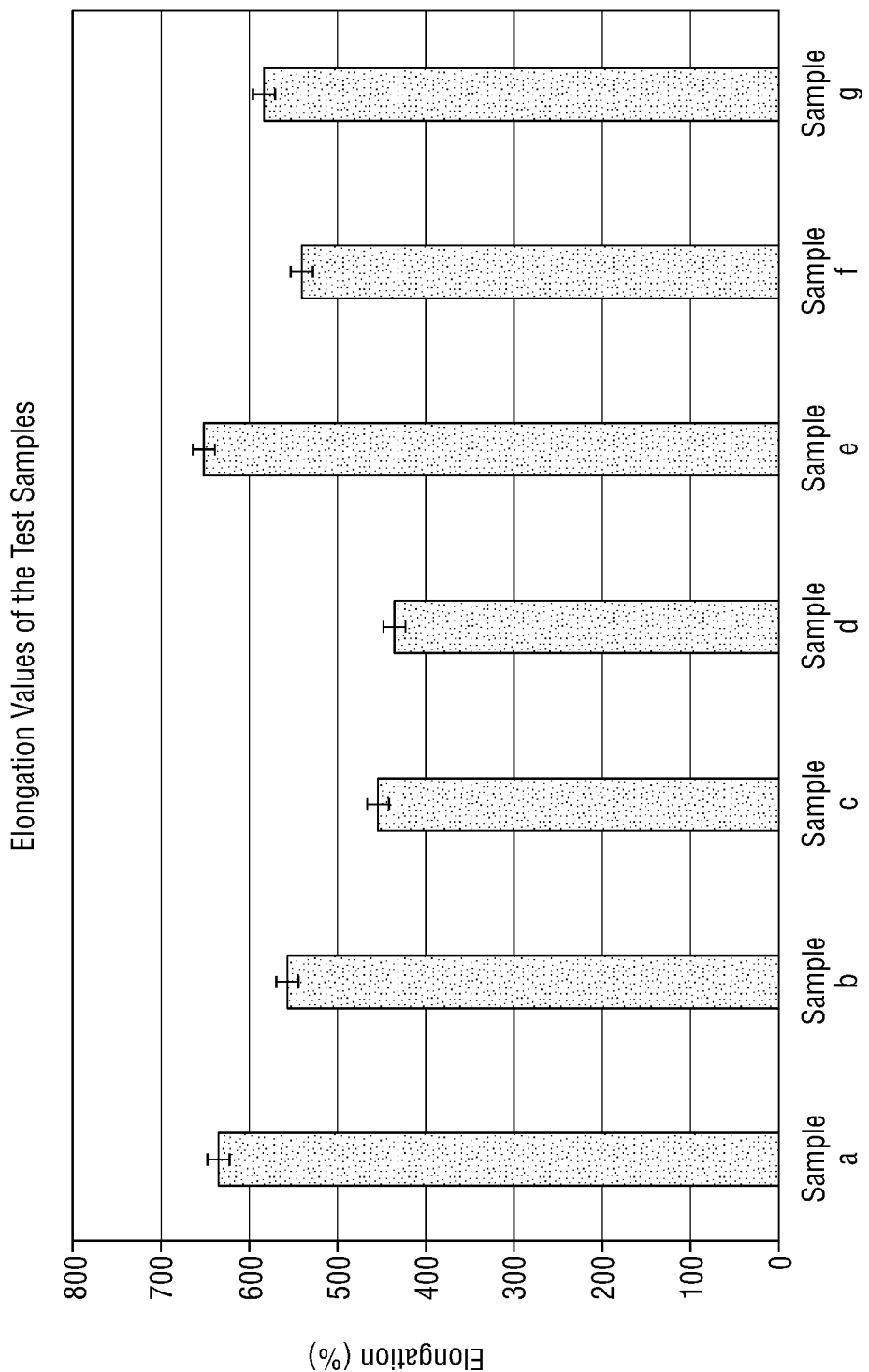

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Silica such as precipitated silica and/or fumed silica may be used as a reinforcement agent in tire tread compounds to reduce rolling resistance and is integral to increasing fuel economy. Silica is hydrophilic or polar. Because the polar silica is not readily compatible with the nonpolar elastomer matrix, there have been constant searches for mixing methods to ensure adequate incorporation of the silica filler in the elastomer matrix.

It has been surprisingly found, according to one or more embodiments of the present invention, that a silica-containing filler can be pre-treated with a bio-based oil such as soy polyol to form a pretreated filler, which can then be combined with elastomer to form a elastomer composition provided with industrially acceptable or better properties, including relatively improved elongation values, while being more economically efficient and more environmentally friendly. Various elastomer products can be formulated by using a bio-based oil treated filler composition. There are several distinctive benefits associated with the elastomer products thus formulated. For instance, the addition of pretreated filler, such as soy polyol treated silica, improves the processibility of the resulting elastomer composition. In certain instances, the resulting elastomer composition has relatively improved elongation. In certain other instances, adding the pretreated silica-containing filler to the Banbury mixer results in relatively lower dusting. These benefits are additional to the benefits in providing significant cost savings and alleviating environmental concerns.

The bio-based oil may be alternatively referred to as sustainable oil, which is in direct contrast to non-sustainable oil such as petroleum oil. The bio-based oil may include one or more vegetable and seed oils and their polyols. Non-limiting examples of the vegetable and seed oils include soy oil, rapeseed oil, canola oil, peanut oil, cotton seed oil, sunflower oil, olive oil, grape seed oil, linseed oil, castor oil; fish oil and oils derived from other animal fats. In certain instances, the bio-based oil may include one or more of vulcanized soy oil, epoxidized soy oil, degummed soy oil, tall oil, linseed oil, castor oil, and orange oil.

The bio-based oils can be derived from a variety of sources such as pine trees, soybeans and oranges. Degummed soy oils can be obtained from soybeans. Tall oil can be obtained from pine trees. Linseed oils can be obtained from flax seeds. Castor oils can be obtained from castor plants. Orange oils can be obtained from orange peels. Vulcanized soybean oils can be obtained from soybeans. The soy oil is then degummed in order to remove the lecithin or gummy substance within the oil.

Most plant oils are aliphatic triglycerides and have various combinations of alkane (single carbon bonds), alkene (double carbon bonds) and alkyne (triple carbon bonds) groups depending upon the chosen plant source. Oils extracted from soybeans, flax seeds and castor seeds are rich in triglycerides. The fatty acids are unbranched aliphatic chains of four to twenty eight carbons in length which are attached to a carboxyl group. The unsaturation within the fatty acids provides opportunities for bonding within the elastomer matrix. The unsaturation of the triglycerides may contribute to the compound's hardness due to cross linking between the fatty acid chains.

The bio-based oil may include one or more oils having a saturation level of less than 30 percent, 25 percent, 20 percent, 15 percent or 10 percent. Such oils may include soybean oil which has a saturation level of 13 to 17 percent, castor oil which has a saturation level of 1 to 5 percent, linseed oil which has a saturation level of 7 to 11 percent, low saturation soy oil which has a saturation level of 5 to 9 percent, or flaxseed oil which has a saturation level of 6 to 10 percent.

In certain instances, the bio-based oil includes soy polyol and optionally soy oil. Soy oil may alternatively be referred to as non-hydroxyl-functionalized soy oil and soy polyol may alternatively be referred to as hydroxyl-functionalized soy oil. Non-hydroxyl-functionalized soy oil can be extracted from soybean plants, and/or soy polyol (hydroxyl-functionalized soy oil) is a product of hydroxyl-functionalization of a soy oil. The term "hydroxyl-functionalized" refers to a reaction or a process whereby one or more hydroxyl groups (—OH) are added to the soy oil molecule. The term "functionality" refers to an average number of isocyanate reactive sites per molecule of soy polyol. It can be calculated according to the following formula: average functionality=(total moles polyol)/(total moles OH). The term "hydroxyl number" refers to a measure of the amount of reactive hydroxyl groups available for reaction. By way of example, this value can be determined by a wet analytical method and is reported as the number of milligrams of potassium hydroxide equivalent to the hydroxyl groups found in one gram equivalent of a sample.

Soy polyol involves relatively less harmful emissions during elastomer formulations than the petroleum oil used alone. There is an estimate of about 5.5 kilograms of carbon dioxide reduction per kilogram polyol produced from soybeans relative to petroleum sources, as soybeans sequester carbon dioxide during growth. Moreover, because soy polyols are produced from plants, they are a renewable raw material and are thus more environmentally friendly.

As a natural source for the soy oil and soy polyol, the soybean or soya bean is characterized as a bushy, green legume related to clover, peas and alfalfa. The pods, stems and leaves are covered with fine brown or gray hairs. Together, oil and protein account for about 60% of dry soybeans by weight; protein at 40% and oil at 20%. The remainder consists of 35% carbohydrate and about 5% ash. The principal soluble carbohydrates, saccharides, of mature soybeans are the disaccharide sucrose (range 2.5-8.2%), the trisaccharide raffinose (0.1-1.0%) composed of one sucrose molecule connected to one molecule of galactose, and the tetrasaccharide stachyose (1.4 to 4.1%) composed of one sucrose connected to two molecules of galactose. Because soybeans contain no starch, they are a good source of protein for diabetics.

The non-hydroxyl-functionalized soy oil can be isolated or extracted from the soybeans using any suitable methods, including the solvent extraction method. In particular, the soybeans are cracked, adjusted for moisture content, rolled into flakes and solvent-extracted with commercial hexane. The oil is then refined, blended for different applications. In general, the major unsaturated fatty acids in soybean oil triglycerides are 7% linolenic acid (C-18:3); 51% linoleic acid (C-18:2); and 23% oleic acid (C-18:1). It also contains the saturated fatty acids 4% stearic acid and 10% palmitic acid.

The soy oil as directly isolated and extracted from the soybeans, like most other vegetable oils, contain no hydroxyl groups in their triacylglycerol structures of saturated and unsaturated fatty acids. For example, crude soy oil consists of about 17 percent saturated triglycerides and about 83 percent unsaturated triglycerides, with about 4.41 double bonds per triglyceride molecule.

The soy polyol or the hydroxyl-functionalized soy oil can be derived from the extracted soy oil using any suitable methods. For instance, to convert the extracted soy oil into soy polyol, hydroxyl groups can be added onto the fatty acid backbone of the extracted soy oil via methods including blowing air through a soy oil, heating the soy oil to an elevated temperature over room temperature and/or adding a catalyst to promote hydroxylation reaction in the soy oil.

It is noted that hydroxyl functionalization is carried out on soy oils that have been extracted out. Any oil molecules incidentally retained within the soy meal, soy flour, soy hull, soy protein, or other soy remnants after oil extraction cannot be effectively hydroxylated. Therefore, incidental inclusion of soy oil from soy meal, soy flour, or soy protein is not expected to effect any appreciable hydroxylation useful for carrying out one or more embodiments of the present invention.

The extracted soy oil and or the hydroxyl-functionalized soy polyol contain primarily triglycerides of fatty acids, which are composed of a carboxyl group attached to a longer chain of hydrocarbons; can be saturated, that is they do not contain any carbon-carbon double bonds, or unsaturated such that they contain carbon-carbon double bonds. The non-hydroxyl-functionalized soy oil as extracted and the hydroxyl-functionalized soy polyol may each have a different distribution and concentration of carbon-carbon double bonds and hydroxyl groups; and as a result, each may give the final elastomer product different characteristics with respect to reaction speed and completion, viscosity, and composition. Without being limited to any particular theories, there and other differences remain to be what distinguish the isolated soy oil component from the conventional petroleum oil as used as the sole oil component in the conventional elastomer products.

The hydroxyl-functionalized soy polyol, as used according to one or more embodiments of the present invention, can be obtained commercially, for instance, under the brand name SoyOyl® R2-052 available from Urethane Soy System Company (USSC). SoyOyl® R2-052 is a two-functional polyol made from unmodified soy oil.

The soy polyol is optionally further processed to reduce volatile contents from the soy polyol. For instance, a vacuum stripping technique can be utilized, such as a wiped film evaporator method, to separate volatiles from the polyol. The soy polyol can be introduced into a heated cylindrical vacuum chamber and through thin-film wiping or sweeping actions, the volatiles vaporize and condense on the inner wall of the vacuum chamber. The condensed liquid, which contains mostly volatile compounds, can be removed.

The soy polyol is optionally further processed to include antioxidants to prevent further oxidation across unreacted double bonds in the polyol. Adding antioxidants helps to reduce formation of aldehydes. Non-limiting examples of antioxidants that can be used in accordance with the present invention include PUR68 and PUR55, available from Ciba Specialty Chemicals of Charlotte, N.C.

The soy polyol can have any suitable molecular weight, as defined as conventional number-average molecular weight. The molecular weight of a given soy polyol can be measured using a Waters gel permeation chromatograph equipped with Waters 2487 dual λ absorbance detector, a Waters 2414 refractive index detector, and two Waters Styragel® HR 1 THF columns. The flow rate of the tetrahydrofuran eluent can be set at 1 mL/min, at 40° C. Polystyrene standards with narrow molecular weight distributions can be used for molecular weight calibration and, therefore, the molecular weight results are relative molecular weights. Exemplary polystyrene standards have molecular weight of $0.93 \times 10^3$, $1.05 \times 10^3$, $1.26 \times 10^3$, $1.31 \times 10^3$, $1.99 \times 10^3$, $2.97 \times 10^3$, $3.37 \times 10^3$, $4.49 \times 10^3$, $4.92 \times 10^3$, and $5.03 \times 10^3$ Daltons.

According to one or more embodiments of the present invention, the soy polyol has functionality in a range of 1.0 to 5.0, and in particular instances, has functionality of 1.0, 1.3, 1.5, 1.8, 2.8, 3.0, 3.5, or 4.0.

The bio-based oil does not include appreciable amount of petroleum oil. When incidentally included, petroleum oil is of no greater than 25 percent, 15 percent, 5 percent, 1 percent, 0.1 percent, or 0.005 percent by weight of the total weight of the filler composition or the final elastomer composition including the filler composition.

The term "petroleum oil" may refer to naturally occurring mixture of hydrocarbons of various weights, as a result of conventional oil extraction processes known in the art. The hydrocarbon may include alkanes, cycloalkanes, and various aromatic hydrocarbons. The petroleum oil as used herein may include organic compounds such as nitrogen, oxygen, and sulfur, and trace amounts of metals such as iron, nickel, copper, and vanadium. By way of example, the petroleum oil may include 83 to 87 weight percent of carbon, 10 to 14 weight percent of hydrogen, 0.1 to 2 weight percent of nitrogen, 0.5 to 6 weight percent of sulfur, and any combinations thereof.

The petroleum oil may include at least one of paraffinic oil, naphthenic oil, aromatic oil, polyethylene polyol, polypropylene polyol, acrylic polymer polyol, polyolefin polyol and polystyrene polyol. Compared to soy polyol which includes one or more triglyceride backbone, these petroleum derived polyols may not.

In one or more embodiments, the bio-based oil does not include appreciable amount of epoxidized oil. When incidentally included, epoxidized oil is of no greater than 25 percent, 15 percent, 5 percent, 1 percent, 0.1 percent, or 0.005 percent by weight of the total weight of the filler composition or the final elastomer composition including the filler composition. The epoxidized oil may be an epoxidized soy oil.

According to another aspect of the present invention, a method of forming an elastomer composition includes a premixing step of mixing silica with soy polyol together prior to mixing with an elastomer. As depicted in FIG. 1A and FIGS. 1B1 and 1B2, this premixing step may be performed for a period of time, for instance, a period of 10 hours, 17 hours, 24 hours, 31 hours or 38 hours. This premixing step may be carried out at or near ambient temperature, for instance, 23 to 27 degrees Celsius, at or near ambient pressure, for instance, 0.8 to 1.2 bar, and/or at a mixing speed of from 30 to 60 rpm. The premix may then be mixed with elastomer and other components in an upside-down method in which the soy polyol and silica pre-mix composition is added to the Banbury before addition of the elastomer.

In the filler composition, a weight ratio of silica to soy polyol may be of from 1.5 to 2.5, 1.7 to 2.3 or 1.9 to 2.1.

The method may then include mixing the resultant premix of silica and soy polyol with elastomer and other components in a multi-pass mixing method, which can be a method including two passes, three passes or more passes as need. An non-limiting example of the multi-pass mixing method includes first, second and third mixing. In the first mixing, the mixing container is set at a temperature of between 60 to 70 degrees Celsius and is set with a filler factor of between 65 to 75 percent. The premix of soy polyol and silica is placed inside the mixing container, optionally with one or more other components such as carbon black; then elastomer is placed on top. The mix is mixed for up to 1 minute, 2 minutes, 3 minutes, 4 minutes or 5 minutes and then released at an elevated temperature of 140 to 180 degrees Celsius. The upside-down method means placing elastomer on top in the Banbury mixer, which is different than the pre-mixed roller process of rolling the silica in the oil. The roller does not rotate up and down. There are either 2 intermeshing or 2 tangential mixtures that rotate towards each other and pull the mix between the blades and the walls of the chamber to build up shear forces. At the end of the first pass, the mix is released out of the roller chamber and then is returned back to the same chamber for the second pass.

In the second pass, the mix from the first pass is placed back in the roller (for instance, a Banbury mixer or roller) and then one or more processing aids such as zinc oxide, stearic acid and/or wax are placed in with a gap in time of no less than 5 second, 10 second, 15 seconds, or 20 seconds, and no greater than 2 minutes, 1 minute, 45 second, or 35 seconds. This sequence of addition of chemicals/materials has been particularly useful to get a good mixing of elastomer, filler and oil, without premature cure of the elastomer compound. In this connection, surfur is added in the final of the passes (the $3^{rd}$ of 3 passes or the $2^{nd}$ or 2 passes, for instance) since shorter mixing times and lower temperatures are sometimes preferable to reduce premature curing of the rubber or elastomer. Therefore the mixing temperature should be carefully handled to avoid unnecessary cure in the Banbury mixer. During the first pass, we focus on getting good dispersion of the filler and oil into the elastomer. In this connection, silica, fillers and soy polyol are added in the first pass to ensure good mixing and to complete the chemical reaction involving the silane coupling agent.

In the third pass, the starting temperature and the ending temperature are generally lower than those in the first and second pass. The starting temperature for the third pass may be 5, 10, 15, 20 or 25 degrees lower and the ending temperature for the third pass may be 15, 30, 45, or 60 degrees lower than those of the first and second pass. The elastomer containing mix from the second pass may be added in batches into the roller such as the Banbury during this third pass. For instance, the second pass mix may be added in half, followed by the addition of sulfur and accelerators, and then the other half of the second pass mix. The accelerator and sulfur are added only during the last third step to reduce premature cure, where temperature is relatively lower and mixing time is relatively shorter.

According to one or more embodiments of the present invention, the silica-containing filler may further include carbon black or a filler blend of carbon black and an ancillary filler selected from the group consisting of soy protein, soy meal, soy flour, soy hull, and combinations thereof.

The soy protein as used herein can be a rigid material, containing certain functional groups, such as carboxylic acids and substituted amine groups which may make coupling with coupling agents. Various forms of dry soy protein can be used, including those available under the brands of PRO-FAM®, ARDEX®F, ARCON®, TVP®, and SOYLEC®. The soy protein may be ground to any suitable size. In particular instances, the dry soy protein can be ground to sizes in a range of 10 to 150 microns, 20 to 140 microns, 30 to 130 microns, or 40 to 120 microns. For comparison purposes, conventional carbon black is of sizes in a range of 10 to 60 nanometers.

The dry soy protein is optionally chemically modified to increase toughness and water resistance. For instance, Wu et al., (Studies on the toughness and water resistance of zein-based polymers by modification, Polymer, 44, 3901-3908 (2003)) modified protein by using low molecular weight polycaprolactone (PCL)/hexamethylene diisocyanate (HDI) prepolymer. Through a chemical reaction between the amino acid in the protein, and HDI modified PCT, a urea-urethane linkage in the protein and PCL prepolymer complex can be formed, leading to an increase in toughness and water resistance of the modified soy protein.

The soybean meal may refer to the material remaining after solvent extraction of oil from soybean flakes. Soybean meal may be toasted with moist steam and ground in a hammer mill.

The soy flour may refer to defatted soybeans where special care is taken during desolventizing (not toasted) in order to minimize denaturation of the protein to retain a high Nitrogen Solubility Index (NSI), for uses such as extruder texturizing (TVP). It is the starting material for production of soy concentrate and soy protein isolate. Defatted soy flour is obtained from solvent extracted flakes, and contains less than 1% oil.

The ancillary filler may include one or more of the following materials: calcium carbonate, sericite, alumina, magnesium carbonate, titanium oxide, clay, talc, magnesium oxide, and aluminum hydroxide.

In one or more embodiments, the elastomer may include one or more of natural elastomer, solution styrene butadiene elastomer (SBR), emulsion SBR, butadiene elastomer (BR), butyl elastomer (IIR), styrene isoprene butadiene elastomer (SIBR), polybutadiene, isoprene-butadiene elastomer (IBR), acrylonitrile butadiene elastomer (NBR), chloroprene elastomer, ethylene propylene diene monomer (EPDM), and combinations thereof. In certain particular instances, the elastomer is ethylene-propylene ethylidene norbornene.

The elastomer composition may be formed into articles of various shapes and for different uses. These articles include tire treads, gaskets, floor mats, splash shields, shoes, conveyor belts and radiator shields.

The elastomer article as described herein can be used for both interior and exterior vehicle applications, wherein the elastomer article may have one or more of the following characteristics: a percent elongation of greater than 150%, 250%, 350%, 450%, or 550%; a tensile strength of greater than 5 MPa, 5.5 MPa, 6 MPa, or 6.5 MPa; a tear resistance of greater than 25 KN/m, 30 KN/m, 35 KN/m, 40 KN/m, or 45 KN/m; and a hardness value of greater than 60 Shore A, 65 Shore A, 70 Shore A, or 75 Shore A. In accessing these various properties of the elastomer articles, the following methods can be illustratively employed: ASTM D412 for measuring tensile strength and percent elongation, ASTM D624 for measuring tear resistance, and ASTM D2240 for measuring hardness.

In particular, tensile strength and percent elongation (% elongation) can be measured in accordance with ASTM D412. Specimens with one inch grip width and 5.5 inches in total length are stamped from 12.5 millimeter thick slabs using a tensile bar die. An Instron Model 5565 with 500N load cell in a tensile geometry is used to pull the samples at a cross-head velocity of 50 mm/min. Tensile strength and % elongation values are recorded for approximately five samples per set.

Suitable elastomers include natural elastomer (NR), polybutadiene elastomer (BR) and styrene butadiene elastomer (SBR), or combinations (blends) thereof.

Elastomeric compounds may be characterized using suitable analysis metrics, including Dynamic Mechanical Analysis (DMA). In addition, cure time and curing temperature may be used to assess kinetic properties and physical properties may be analyzed based on tensile, elongation, tear and durometer.

Having generally described several embodiments of this invention, a further understanding can be obtained by reference to certain specific examples which are provided herein for purposes of illustration only and are not intended to be limiting unless otherwise specified.

EXAMPLE

Example 1

A non-limiting method of mixing silica-containing filler in elastomer compounds may include a multiple-pass mixing method. Multiple pass mixing method may be desirable to accommodate the temperature-sensitive reaction often associated with the use a coupling agent such as a silane coupling agent and/or to facilitate adequate shear to disperse the silica.

To evaluate the ease of processing the elastomer within a manufacturing environment, several tests can be performed on the elastomer compounds, including Mooney Viscosity and Mooney Scorch. Higher viscosity levels make processing and extruding the elastomer more difficult.

Aromatic oil can be used as the baseline for the model formulations due to its prevalence in tread compounds in the past. Naphthenic oil can be included as another comparison of potential oils to replace aromatic oils. Petroleum oils are commonly used in elastomer compounding as processing aids and plasticizers to lower viscosity, improve low-temperature flexibility and yield a softer product.

Tread formulations are compounded in a Farrel Model F270 Banbury Mixer using a 70% fill factor with ram pressure set to 50 psi. The elastomer is mixed using a multi-pass system, with the elastomers, pre-treated fillers, processing oil and silane coupling agent added in the first pass. The cure activators, antidegradants and processing aid are added to the master batch in the second pass. In the first two mixing stages, the rotor speed is increased after the ingredients are incorporated in order to bring the batch temperature to 160° C. to complete the silanization reaction. The primary and secondary accelerators and sulfur are mixed with the master batch in the final (productive) pass.

Precipitated silica is used as a reinforcement agent in tire tread compounds to reduce rolling resistance and is integral to increasing fuel economy. Silica is hydrophilic and pretreating with soybean oil coats the silica and can lead to better dispersion and improved properties. The effect of using soy oil, soy polyol, epoxidized soy oil, and low saturation soy oil to pretreat the silica is examined, with residual aromatic extract (RAE) petroleum oil used as a control. The use of soy oil as a pretreatment can increase the compatibility of the elastomer matrix and precipitated silica filler. Without wanting to be limited to any particular theory, it is believed that the silica and the bio-based oil is merely physically combined/mixed at this pre-mixing step without inducing any chemical reactions. In certain instances, the silica going into the premixing roller may have been pretreated with a coupling agent such as a silane coupling agent.

Soy-based oils offer a range of chemical properties compatible with different types of elastomers used in tire tread applications. Pretreating silica with soy polyol provides the resultant elastomer composition with improved processibility, elongation and tear resistance. If soy-oils are able to be used as full replacement of petroleum processing oils, a twenty pound passenger tire could use up to one pound of this sustainable product. The environmental benefit becomes even more significant if the technology is able to be migrated across all passenger tires in the U.S. If successful, up to 28 million pounds of soy oil could be utilized in this capacity per year.

Silica-filled elastomer samples are mixed in a multi-pass method according to the schedule depicted in Table 1.

TABLE 1

| exemplified multi-pass mixing schedule | |
|---|---|
| First Mix - upside-down mixing | |
| Start Temperature | 65° C. |
| Start Rotor Speed | 65 rpm |
| Fill Factor | 70% |
| Pressure | 50 psi |
| Mixing Sequence | At 0 minute, add carbon black, silica, oil, Si69, and then add elastomer on top |
| | At 1 minute, sweep |
| | Hold for 3 to 6 minutes after sweep |
| | Dump at 160° C. |
| Second Mix | |
| Start Temperature | 65° C. |
| Start Rotor Speed | 65 rpm |
| Fill Factor | 70% |
| Pressure | 50 psi |
| Mixing Sequence | At 0 minute, add first pass mix at 0 minute |
| | At 30 seconds, add zinc oxide, stearic acid, processing aid and wax |
| | At 1 minute, sweep |
| | Mix for 2 to 5 minutes after sweep |
| | Dump at 160° C. |
| Third Pass | |
| Start Temperature | 50° C. |
| Start Rotor Speed | 60 rpm |
| Fill Factor | 70% |
| Pressure | 50 psi |
| Mixing Sequence | At 0 minute, add half of the second pass mix |
| | At 15 seconds, add sulfur and accelerators |
| | At 30 seconds, add remaining second pass mix |
| | At 1 minute, sweep |
| | Mix for 90 seconds after sweep |
| | Dump at 110° C. |

Example 2

Compounding and testing are evaluated for the premix compositions listed in Table 2 shown below, which are then compounded with elastomer according to the procedure illustrated in Table 1 above:

a) Soy oil and silica preblended 24 hours b) Soy oil and silica not preblended c) Aromatic oil and silica preblended 24 hours d) Aromatic oil and silica not preblended e) Soy polyol (50 OH#) and silica preblended 24 hours f) Epoxidized soybean oil and silica preblended 24 hours g) Low saturation soy oil and silica preblended 24 hours

TABLE 2

| Ingredients | Main Function | Weight Percentages | | | | | | |
|---|---|---|---|---|---|---|---|---|
| | | a | b | c | d | e | f | g |
| SBR (50% vinyl and 25% styrene) | Elastomer | | | | 36% | | | |

TABLE 2-continued

| Ingredients | Main Function | Weight Percentages | | | | | | |
|---|---|---|---|---|---|---|---|---|
| | | a | b | c | d | e | f | g |
| Buna CB 1203 | Elastomer | | | | 12% | | | |
| Carbon black | Filler | | | | 4.8% | | | |
| Zeosil 1165 MP | Silica | | | | 28.9% | | | |
| Si69 | Coupling Agent | | | | 2.3% | | | |
| Holly Sundex 8000EU | Aromatic Oil | 0 | 0 | 16% | 16% | 0 | 0 | 0 |
| Cargill Soy Oil | Soy Oil | 16% | 16% | 0 | 0 | 0 | 0 | 0 |
| Low Saturation Soy Oil | Soy Oil | 0 | 0 | 0 | 0 | 0 | 0 | 16% |
| Galata ESBO | Expoxidized Soy Oil | 0 | 0 | 0 | 0 | 0 | 16% | 0 |
| Soy Polyol 50 KOH/g | Soy Polyol | 0 | 0 | 0 | 0 | 16% | 0 | 0 |

Premixing of the oil and silica filler in the roller occurs before this step of the Banbury mixing process. This chart includes all of the materials added in the Banbury.

While compounding the elastomer for this study, it is noted that there is a significant advantage in processing for the preblended soy polyol, low saturated soy oil and epoxidized soy oil formulations, for instances, as indicated in samples "e", "f" ang "g" stated herein. The elastomer easily dumps from the Banbury without sticking to the walls and the doors. It is also much easier to sheet out on the two-roll mill. This can be a distinct advantage in a production environment. The processability of the control and preblended compounds are displayed on a 5-point point scale in Table 3.

TABLE 3

Processability of preblended and control silica formulations

| | Formulations | Processability* |
|---|---|---|
| a) | Soy oil and silica, preblended 24 hours | 1 |
| b) | Soy oil and silica, not preblended (control) | 1 |
| c) | Aromatic oil and silica, preblended 24 hours | 1 |
| d) | Aromatic oil and silica, not preblended (control) | 1 |
| e) | Soy polyol (50 OH#) and silica, preblended 24 hours | 5 |
| f) | Epoxidized soybean oil and silica, preblended 24 hours | 5 |
| g) | Low saturation soy oil and silica, preblended 24 hours | 3 |

* Processability is assessed on a scale of 1 to 5, with 1 representing relatively worse processability and 5 representing relatively better processability.

Elongation is measured in these preblended compositions. FIG. 2 illustratively demonstrates that the soy oil, soy polyol and low-sat soy oil preblended compounds exhibit relatively higher elongation.

While the best mode for carrying out the invention has been described in detail, those familiar with the art to which this invention relates will recognize various alternative designs and embodiments for practicing the invention as defined by the following claims.

What is claimed:

1. A method comprising:
   mixing a filler including silica and a bio-based oil including a soy polyol to form a filler mixture, the weight ratio of silica to the soy polyol being 1.5 to 2.5; and
   mixing the filler mixture with an elastomer to form an elastomeric composition, the elastomer being present in an amount less than 25 weight percent of the elastomeric composition.

2. The method of claim 1, wherein the first mixing step includes mixing the filler including silica, the bio-based oil including the soy polyol, and a petroleum-based oil present in an amount of less than 25 weight percent of the elastomeric composition.

3. The method of claim 1, wherein the bio-based oil further includes a soy oil.

4. The method of claim 1, wherein the first mixing step includes mixing the filler including silica, the bio-based oil including the soy polyol, and an epoxidized oil present in an amount of less than 25 weight percent of the elastomeric composition.

5. The method of claim 1, wherein the soy polyol has a hydroxyl number of from 10 to 350 KOH/g.

6. The method of claim 1, wherein the first mixing step includes mixing the filler including silica, the bio-based oil including the soy polyol, and carbon black.

7. The method of claim 1, wherein the first mixing step includes mixing the filler including silica, the bio-based oil including the soy polyol, and an ancillary filler.

8. The method of claim 7, wherein the ancillary filler is selected from the group consisting of soy protein, soy flour, soy meal, soy hull and combinations thereof.

9. The method of claim 1, wherein the weight ratio of silica to soy polyol is in the range of 1.7 to 2.3.

10. The method of claim 1, wherein the weight ratio of silica to soy polyol is in the range of 1.9 to 2.1.

11. The method of claim 1, wherein the first mixing step includes mixing and rolling the filler including silica and the bio-based oil including a soy polyol to form the filler mixture.

12. The method of claim 1, wherein the first mixing step is performed in a mixer.

13. The method of claim 1, wherein the first mixing step is carried out at a starting temperature and proceeds to an ending temperature greater than the starting temperature.

14. A method comprising:
   mixing a filler including silica and a bio-based oil including a soy polyol to form a filler mixture, the weight ratio of silica to the soy polyol being 1.5 to 2.5;
   mixing the filler mixture with an elastomer to form an elastomeric composition, the elastomer being present in an amount less than 25 weight percent of the elastomeric composition; and
   curing the elastomeric composition to obtain a cured elastomeric composition.

15. The method of claim 14, wherein the weight ratio of silica to soy polyol is in the range of 1.7 to 2.3.

16. The method of claim 14, wherein the weight ratio of silica to soy polyol is in the range of 1.9 to 2.1.

17. A method comprising:
mixing a filler including a precipitated silica material and a bio-based oil including a soy polyol to form a filler mixture, the weight ratio of precipitated silica material to the soy polyol being 1.5 to 2.5; and
mixing the filler mixture with an elastomer to form an elastomeric composition, the elastomer being present in an amount less than 25 weight percent of the elastomeric composition.

18. The method of claim 17, wherein the weight ratio of silica to soy polyol is in the range of 1.7 to 2.3.

19. The method of claim 17, wherein the weight ratio of silica to soy polyol is in the range of 1.9 to 2.1.

20. The method of claim 17, wherein the filler further includes carbon black.

* * * * *